Aug. 15, 1961 C. C. MILLS 2,995,959

SAW CHAIN SHARPENER

Filed Dec. 15, 1959

Inventor
Clifford C. Mills
by Erwin Koppel
Attorney

United States Patent Office 2,995,959
Patented Aug. 15, 1961

2,995,959
SAW CHAIN SHARPENER
Clifford C. Mills, P.O. Box 165, Mercer, Wis.
Filed Dec. 15, 1959, Ser. No. 859,664
4 Claims. (Cl. 76—36)

This invention relates to a sharpening apparatus and more particularly to a file sharpener for a saw chain.

Chain saws are mounted on a power driven track with spaced teeth projecting outwardly for cutting, adjacent teeth along the chain generally having their cutting edges inclined in opposite directions. Operating by power and high speed causes the cutting teeth to become dull and requires periodic sharpening for efficient cutting. When such sharpening is effected, it is desired that each tooth be sharpened alike; that is, with the file set at the same depth and at one of the two opposite angles.

It is an object of the present invention to provide a sharpening apparatus for a saw chain that is simple, easily adjustable, reliable and efficient in each cutting operation.

It is another object of the present invention to provide a sharpening apparatus for a saw chain that permits the depth and angle adjustment to be preset so that the teeth can be filed without changing the settings.

It is a further object of the present invention to provide a sharpening apparatus for a saw chain that can be permanently adjusted for sharpening the teeth in three steps.

It is still another object of the present invention to provide a sharpening apparatus for a saw chain that is light weight, durable, allows a reciprocating file to use its entire file length and pivots the file frame out of the way as teeth are slid into position for sharpening.

In order that the invention may be fully understood, the following drawings are provided, in which.

Figures 1, 2, 3, 4:
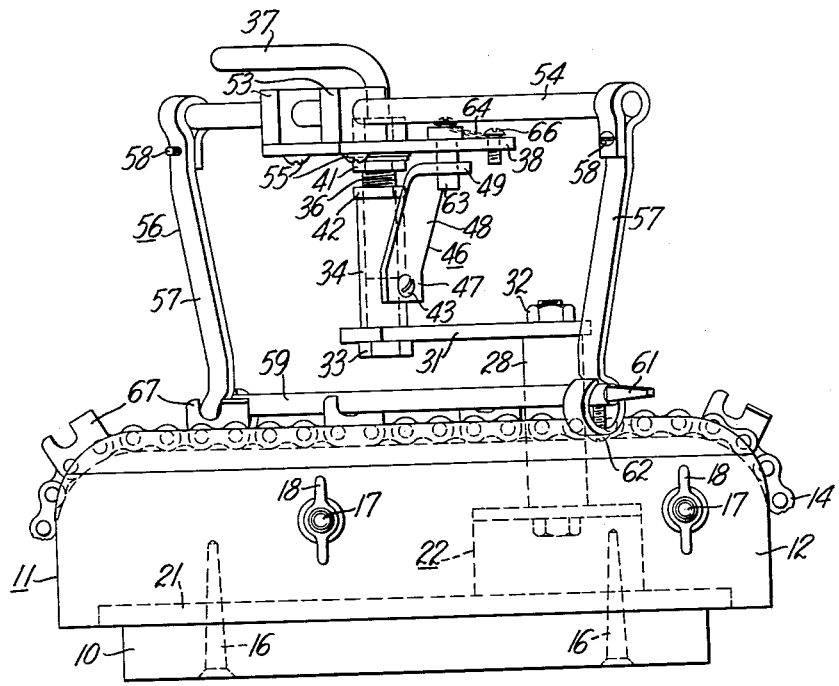
FIG. 1 is an elevation view of the invention showing the file in sharpening position.
FIG. 2 is an end view of the invention with the saw chain removed for clarity.
FIG. 3 is a top view showing the file frame set at a predetermined sharpening angle.
FIG. 4 is a top view with the file frame set at a different angle from FIG. 3.

In the invention as shown in FIG. 1 a support 10 is provided which can be made of wood for fastening to a bench, a stump or a truck tail gate by conventional fastening means, such as screws. Holding means 11 comprise two parts 12 and 13, which may also be of wood, for releasably clamping a saw chain 14 therebetween. As seen in FIG. 1 holder 11 is mounted on support 10 by screw 16, and the top end portions are rounded on the ends to allow chain 14 to slide easily through the holder 11. Only one of holder parts 12 and 13 is fastened to support 11 by the screws 16 so that parts 12 and 13 are movable relative to each other. Bolts 17 pass through holder parts 12 and 13 with wing nuts 18 on the end thereof for tightening or loosening the relationship of holder parts 12 and 13 to respectively clamp or release the chain 14. The clamping takes place when a tooth is positioned for sharpening, and the releasing takes place to allow the chain to be slid along for positioning the next tooth for sharpening. As seen in FIG. 2, a groove 19 is formed along the top adjacent edges of holder parts 12 and 13 to allow chain 14 to be positioned and clamped for sharpening. Block 21 is positioned at the bottom adjacent edges of holder parts 12 and 13 to provide a tight parallel fit on the adjacent edges when the chain is clamped and also have a gap therebetween for the chain to slide through.

Fastened on to the outside of holder part 13 is a right angle metal bracket 22 with one bracket side 23 attached to holder part 13 by bolts 24 and nuts 26. The other bracket side 27 extends horizontally from holder means 11 and forms a mounting for the vertical adjusting means, now to be described.

A cylindrical sleeve 28 extends upwardly from a mounting on bracket 22 where it is held in place by a bolt 29 passing vertically through sleeve 28 from the bottom of bracket side 27. On the top of sleeve 28 is mounted a metal bar 31 with a hole at one end for bolt 29 to pass through and lock bar 31 and sleeve 28 together with nut 32. It will be seen from FIGS. 1 and 2 that the upper part of sleeve 28 extends above holder 11, and bar 31 is angularly positioned so that its end remote from sleeve 28 is over holder 11.

The end of bar 31 that is over holder 11 has a hole formed therein to allow a cap screw 33 to pass therethrough for mounting a sleeve 34 extending upwardly from bar 31. Sleeve 34 is internally threaded to vertically receive a threaded adjusting screw 36 that is bent at a right angle at its top end to form an adjusting handle 37. At the top of the threaded portion of screw 36 and prior to the right angle bend a horizontal plate 38 is mounted over a number of washers 39 and a threaded lock nut 41. A second lock nut 42 is also positioned on screw 36 between lock nut 41 and the top of sleeve 34. In the lower part of sleeve 34 above plate 31 a bolt 43 passes through to be tightened by a nut on the opposite side (not shown) to fasten a metal bracket extension 46 to sleeve 34. Extension 46 has a lower vertical flat portion 47 which includes a hole for bolt 43 to pass therethrough. The middle section 48 of extension 46 is angularly positioned with respect to lower flat portion 47, and the upper section 49 of extension 46 is horizontal and flat with a hole formed therein to match with one of a plurality of holes in plate 38.

The vertical adjusting means just described is seen to comprise an offset structure that includes sleeve 28, bar 31, sleeve 34 and bracket extension 46 permanently affixed to support bracket 22. Adjusting handle 37 can be rotated for moving plate 38 vertically for the desired vertical adjustment described hereinafter.

In the embodiment shown plate 38 includes two holes 51 and 52, as shown in FIGS. 3 and 4, which are 70° apart on an arc taken from adjusting screw 36 as a radius. It should be understood that the use of two holes and the angle of 70° is not a limitation on this invention, but as will be explained hereinafter, cutting teeth are conventionally set at a 35° angle and the use of two holes 70° apart will allow teeth to be sharpened that are set at opposite 35° angles. Plate 38 further includes a pair of bearings 53 mounted thereon by bolts 55 to allow a rod 54 of file frame 56 to pass therethrough for either pivotal or reciprocating movement. At each end of rod 54 arms 57 extend downwardly and are mounted by bending over the top ends of arms 57 and tightening with set screws 58. Between the lower ends of arms 57 sharpening file 59 is positioned and held in place by set screws 62. File 59 has end 61 formed to receive a handle (not shown) for manual operation. It will be seen from FIGS. 1 and 2 that arms 57 are offset inwardly as they extend downwardly to allow the full length of file 59 to be used during the reciprocating sharpening movement, despite the spacing of bearings 53 from each other.

A movable pin 63 is fastened to plate 38 through a chain 64 connected to screw 66 mounted in one end of plate 38. When the hole in top section 49 is aligned with either hole 51 or 52, then pin 63 is passed through such alignment to fix plate 38 in a non-rotatable position relative to fixed extension 46.

In operation the chain 14 is slid in groove 19 between holder part 12 and holder part 13 to be clamped in place by wing nuts 18. Chain 14 includes a plurality of spaced teeth 67, and each tooth has its cutting edge preset at a 35° angle. Adjacent teeth have their cutting edges set at opposite 35° angles so it is necessary that the sharpening device can be positioned at either angle for sharpening. Lock nut 42 is loosened and handle 37 is rotated to lower the file frame 56 until file 59 has approximately one-fifth of its diameter above the tooth to be sharpened, as this is the conventional position for most efficient sharpening. File 59 will now be in the position shown in FIGS. 1 and 3. Hole 52 is aligned with the hole in upper section 49 of extension 46, and pin 63 is dropped through to fix file frame 56 at the desired angle. All teeth with this angle of cutting edge can now be sharpened without changing this setting. Lock nut 42 is now tightened to set the vertical adjustment which will be unchanged for all teeth in the saw chain. The sharpening apparatus is ready for sharpening a tooth, and frame 56 with file 59 is manually reciprocated for this purpose in bearings 53. Upon finishing the sharpening of a tooth 67, file frame 56 is pivoted in bearings 53 to lift file 59 up and away from the tooth. Wing nuts 18 are loosened and chain 14 slid along in groove 19 until the next tooth with the same angle cutting edge is in position for sharpening. File frame 56 is swung down and it will be seen that file 59 is thereupon all set from the original adjustments for filing this tooth, and the reciprocating strokes can be effected. The sharpening action on all teeth of similar cutting angle continues in like manner around the chain. Upon completion of this phase of the sharpening, pin 63 is lifted out of hole 52 and plate 38 is swung on washers 41 to align hole 51 with the hole in upper section 49. Pin 63 is then passed through the hole to nonrotatably fix plate 38 for the other sharpening phase. It will be realized that the previous vertical adjustment is unchanged and sharpening of alternate teeth with the opposite angled cutting edge can now be completed around the chain as described hereinbefore.

It is seen that the present invention provides a simple and easily operated sharpening device. Only three settings or steps are required: dropping pin 63 through either hole 51 or 52 for the angled setting; rotating and locking handle 37 and screw 36 for the vertical adjustment; and tightening wing nut 18 to lock chain 14 in the holder. It should be noted that pin 63 need be changed but once during the entire sharpening operation, and the vertical adjustment is unchanged after the original adjustment.

The particular embodiment of the invention illustrated and described is to be considered illustrative only. The present invention includes such other modifications and equivalents as may readily occur to those skilled in the art, within the scope of the appended claims.

It is claimed and desired to secure by Letters Patent:

1. Sharpening apparatus for the teeth of a chain saw comprising saw chain holding means having two sides within which the chain can be slid and fastening means to clamp said sides together to hold said chain in a selected position, an angle bracket fastened on one of said sides with a first sleeve extending upwardly therefrom offset from said chain, a bar fastened at one end to the top of said sleeve and extending horizontally over said chain, a second sleeve mounted on the other end of said bar and extending upwardly to form a mounting for a reciprocating file, said mounting comprising a plate mounted on the upper end of said second sleeve and having bearing means integral therewith to provide for reciprocation and radial swinging of said file, adjusting means positioned in said second sleeve for determining the desired vertical location of said file, and locking means mounted on said plate to lock said file at said predetermined angular position.

2. Sharpening apparatus for the teeth of a chain saw comprising saw chain holding means having two sides within which the chain can be slid and fastening means passing through said sides to clamp said sides together to hold said chain in a selected position, an angle bracket fastened on one of said sides with a first sleeve extending upwardly therefrom offset from said chain, a bar fastened at one end to the top of said sleeve and extending horizontally over said chain, a second sleeve mounted on the other end of said bar and extending upwardly to form a mounting for a reciprocating file, said mounting comprising a plate mounted on the upper end of said second sleeve and having bearing means located on top of said plate to provide for the reciprocating and radial swinging of said file, a vertical adjusting screw positioned within said second sleeve for determining the vertical location of said plate and mounted file, the upper end of said adjusting screw being bent to a horizontal position to form a handle for rotating said adjusting screw to determine the desired vertical location of said file, locking means mounted on said plate to lock said file at a predetermined angular position, and a rod longer than said file and passing horizontally through said bearings having a downwardly extending, inwardly directed, vertically offset arm at either end to hold said file therebetween and allow the use of its full length for sharpening.

3. Sharpening apparatus for the teeth of a chain saw comprising saw chain holding means having two sides within which the chain can be slid and fastening means passing through said sides to clamp said sides together to hold said chain in a selected position, an angle bracket fastened on one of said sides with a first sleeve extending upwardly therefrom offset from said chain, a bar fastened at one end to the top of said sleeve and extending horizontally over said chain, a second sleeve mounted on the other side of said sleeve and extending upwardly to form a mounting for a reciprocating file, said mounting comprising a plate mounted on the upper end of said second sleeve and having bearing means located on top of said plate to provide for the reciprocating and radial swinging of said file, a vertical adjusting screw positioned within said second sleeve for determining the vertical location of said plate and mounted file, the upper end of said adjusting screw being bent to a horizontal position to form a handle for rotating said adjusting screw to determine the desired vertical location of said file, a locking extension mounted at one end intermediate the ends of said second sleeve and extending angularly to position its other end just below said plate on a radius from the axis of said adjusting screw, locking means comprising a pin loosely mounted on said plate and adapted to be inserted in one of a plurality of holes located in said plate on equal radii from said axis, said pin adapted to pass through one of said plate holes and a corresponding hole in said other end of said extension to lock said file at a predetermined angular position, and a rod longer than said file and passing horizontally through said bearings having a downwardly extending, inwardly directed, vertically offset arm at either end to hold said file therebetween and allow the use of its full length for sharpening.

4. Sharpening apparatus according to claim 3, wherein the holes are two in number and spaced at equal radii 70° apart.

References Cited in the file of this patent

UNITED STATES PATENTS

| | | |
|---|---|---|
| 310,735 | Sherman | Jan. 13, 1885 |
| 2,421,657 | Speed | June 3, 1947 |
| 2,755,559 | Pearce | July 24, 1956 |
| 2,859,642 | Travis | Nov. 11, 1958 |
| 2,900,850 | Travis | Aug. 25, 1959 |